United States Patent Office 3,428,150
Patented Feb. 18, 1969

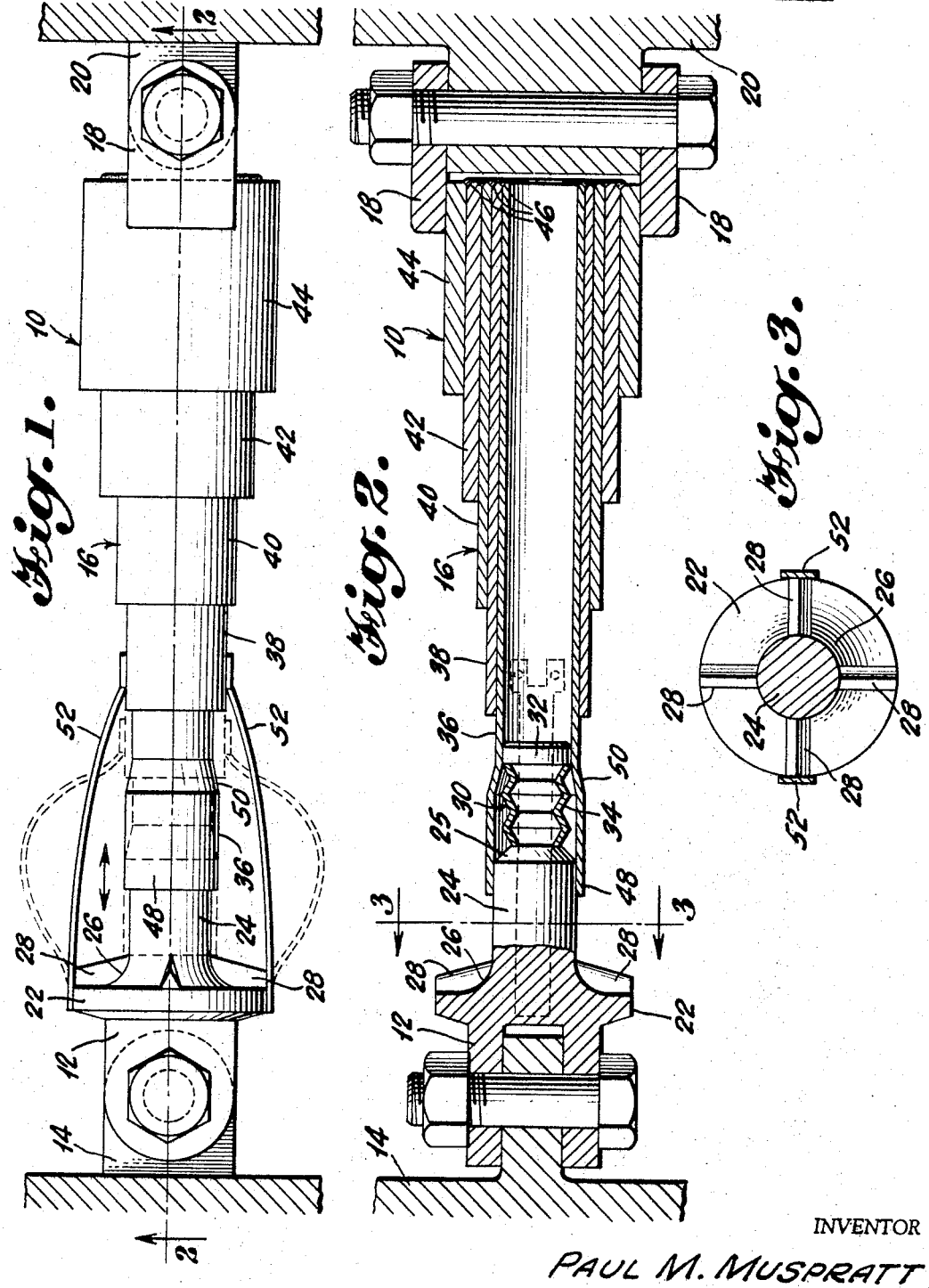

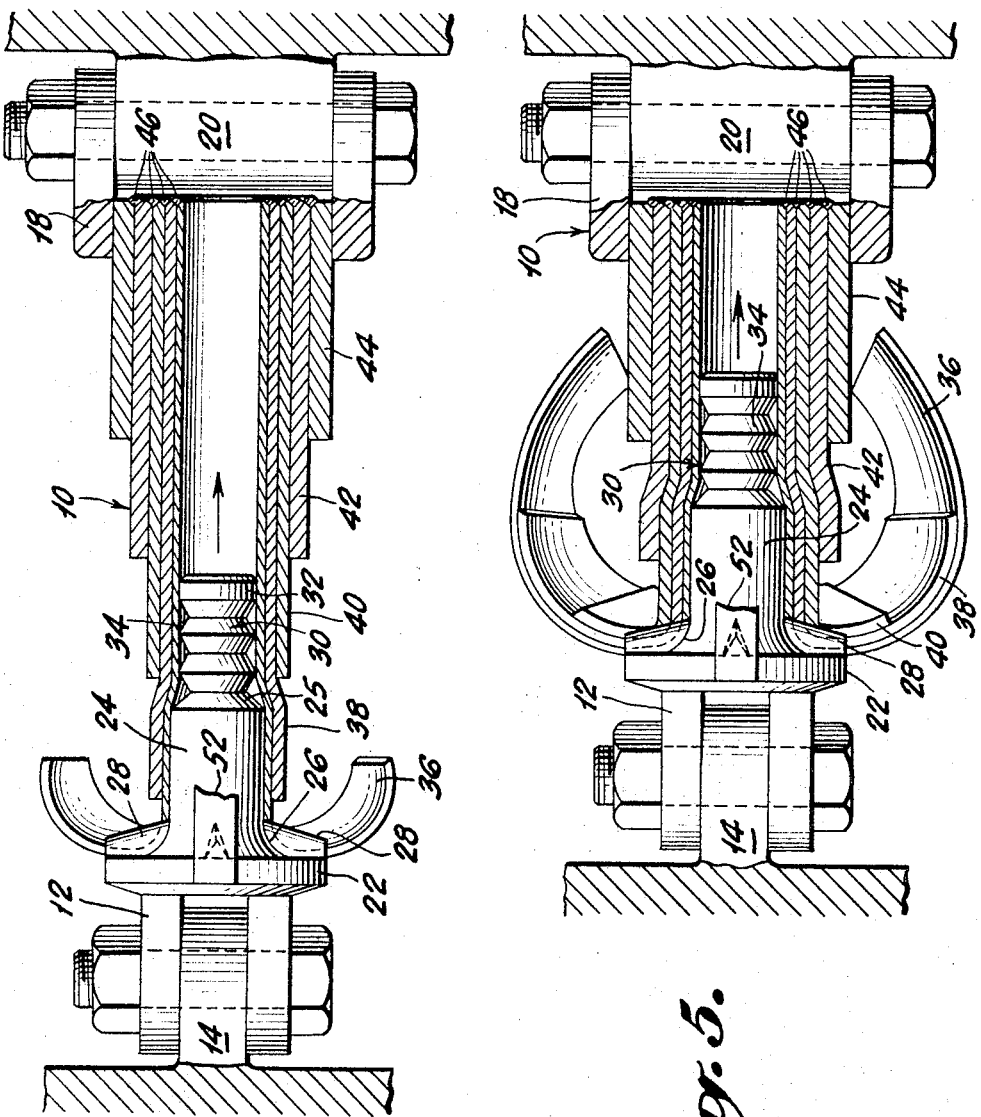

3,428,150
METHOD AND APPARATUS FOR GRADUAL ABSORPTION OF MOMENTUM
Paul M. Muspratt, 302 S. Main St., Jersey Shore, Pa. 17740; E. Claire Muspratt, executrix of said Paul M. Muspratt, deceased
Filed Dec. 28, 1966, Ser. No. 605,328
U.S. Cl. 188—1     4 Claims
Int. Cl. F16d 63/00

ABSTRACT OF THE DISCLOSURE

The invention includes a pair of elongated members arranged for telescoping action upon impact. The first member includes a plunger mounted on a base having a rejection slope and not less than two or more shear blades. The second member is axially aligned with the plunger and has an inner dimension slightly less than the outer plunger dimension. Upon an impact with a force greater than a predetermined one, the plunger enters the second member spreading the same preferably up to the tensile-stress yield point thereof or possibly just above and upon further penetration, the second member is sheared by the shear blades which dissipates additional amounts of kinetic energy. As the members continue to close, the sheared parts of the second member are turned outward by the rejection slope and continuous expansion, shearing, and turning outward take place while dissipating increasing amounts of energy. Thus, the shock forces and kinetic energy are damped and dissipated by the action of continuously expanding the second member and continuously shearing the expanded parts thereof at the increasing expense of the kinetic energy.

---

The present invention relates to a shock absorber and more particularly to an apparatus for damping large forces within a short distance and dissipating large amounts of kinetic energy within a short time.

It is commonly known that shock absorbing systems for moving vehicles, airplanes, or the like, must damp a tremendous momentum within a short distance and a short period of time. For example, a 4,000 pound object impacting a stationary surface at 60 m.p.h. has a momentum of 352,000 pounds.

It has been common in the past to use fluid dashpot and damping principles in shock absorbers of general utility. These absorbers include a piston-cylinder arrangement with an incompressible fluid medium housed so that upon impact, the shock forces are dampened by the high pressure fluid moving through orifices in the piston at a maximum determined rate. Although these fluid shock absorbers provide some protection, it has been found that these systems are not always reliable. For example, periodic monitoring and checks must be made to see if sufficient amounts of fluid still remain in the system. Furthermore, upon impact, the high pressure fluid stresses simultaneously all parts of the system to a maximum making it difficult to calculate the energy absorption rate and making the chance of material failure or rupture more likely. Temperature changes also affect the performance of hydraulic shock systems by changing the fluid viscosity.

It is a purpose of the present invention to avoid the above problems and to provide a completely mechanical shock absorber and which dissipates energy and adsorbs the shock forces by use of new and improved techniques and principles.

Therefore it is an object of the present invention to provide a new and improved shock absorber which damps shock forces by expanding a member and shearing the member thereafter.

Other and further objects of the present invention will become apparent with the following detailed description when taken in view of the appended drawing in which:

FIGURE 1 is an elevation of an embodiment of the invention.
FIGURE 2 is a longitudinal section of FIGURE 1.
FIGURE 3 is a transverse section taken along line 3—3 of FIGURE 1.
FIGURES 4 and 5 are views similar to FIGURE 2 showing additional stages of collapse after shock forces are applied.

With reference to FIGURES 1 through 5, a shock absorber according to the invention is generally indicated as 10 and includes a base member 12 anchored to one reference member 14 and a tube member 16 having a pair of flanges 18 coupled to a second reference member 20. Shock absorber 10 is of general utility and reference members 14 and 20 may includes the bumper and frame of an automobile, the pancake landing frame of an aircraft or helicopter, or a stationary post and movable cables of a highway guardrail system, or any other system which should be protected from uncommon impact forces. The length and width of unit depend upon requirements of the system.

Base 12 includes an enlarged disk or plate 22 with a cylindrical plunger 24 extending toward member 16 from a rejection slope 26 which slopes in all directions away from member 16 and outward from the axis of the system. Base plate 22 is also provided with four equidistant shear blades 28, each extending from plunger 24 to the periphery of plate 22 and having its cutting edge facing member 14. A collapsible guide 30 is mounted coaxially at the front tapered face 25 of plunger 24 and includes a forward cap 32 coupled to plunger 24 by a collapsible hollow tube 34 which is of thin walled, flexible construction.

Tubular member 16 is co-axially arranged with plunger 24 for telescopic movement therewith and includes a series of stage tubes 36, 38, 40, 42 and 44 snugly fitted together and welded at their common ends at 46 to form an integral unit. The tubes may be of the same or of progressively increasing yield point strength. The first stage tube 36 has a forward guide section 48 which is freely slideable on plunger 24 but which narrows at section 50 to an inner diameter which is slightly less than the outer diameter of plunger 24. The diameter of plunger 24. The diameter of plunger 24 and the major part of tube 36 are such that, when telescoped, tube 36 is expanded to the tensile-stress yield point.

The embodiment disclosed includes a circular cross sectioned plunger 24 and tube 36 inner wall but any other suitable configuration may be selected.

Each stage tube 36 through 44 progressively increases in thickness and progressively decreases in axial length generally as shown in the drawings. Although tube 36 is of thinnest construction, it should be thick enough to act as a guide and maintain co-axial alignment for members 12 and 16.

Tubes 36 through 44 may be made of any suitable material such as fiber glass, various metals such as stainless steel, aluminum, copper, brass, or the like, and various alloys as well as various materials from the plastic or rubber families. With any material, the energy it takes to expand the material to its tensile-strength yield point can be calculated and the relative diameters of the tubes and plunger 24 can be determined by standard methods. By performing an integration over the length of member 16, it is possible to calculate the total amount of kinetic energy which must be dissipated before members 12 and 18 are completely telescoped together.

In order to prevent destruction of any of the stage tubes on impact of small forces, the forward end of stage tube 36 is spaced from the shearing edges of blades 28 so as to afford a certain amount of axial play before damping begins. For this purpose, arcuate leaf springs 52 provide resilient connections between plate 22 and tube 38. Thus, members 12 and 16 will be returned to their normal relative positions whenever a force is applied that is less than a predetermined magnitude. If a force is applied that exceeds that magnitude, springs 52 will break away during the damping and absorption action as described below. It should be understood that other tensioning means such as chains, cables, or the like, may be provided to prevent excess relative axial withdrawal of members 12 and 16. Furthermore, these chains or cables can cooperate with a transverse strut which receives side impact forces causing a relative closing of members 12 and 16 even though the impact forces are not applied parallel to the axis of the device.

In operation, shock absorber 10 provides resilient axial play for forces less than a predetermined magnitude in the manner described above. Upon experiencing excess impact, members 14 and 20 are driven toward each other and forward section 48 of tube 36 travels along plunger 24 and after being sheared by blades 28, the sheared parts engage and are turned outward by the rejection slope 26. Direction guide 30 maintains alignment so that the small dimensioned part of tube 36 is guided on to face 25. As the closing action continues tube 36 is expanded by plunger 24 up to its calculated tensile-yield point or to some value above this figure. For optimum results expansion tube 36 is expanded to a point suitably near the tensile-stress yield point for the particular material used. The relative dimensions of tube 36 and plunger 24 are selected to give this result.

As plunger 24 continues to close, the shearing and turning-back action continues. Additional energy is dissipated when tube 38 is expanded by the penetration of plunger 24, and again additional amounts of energy are dissipated due to the shearing of tubes 36 and 38 by blades 28 and the turning-back of the cut portions thereof. Increasing amounts of kinetic energy are dissipated by the subsequent expansion of tubes 40, 42 and 44 which are progressively thicker in cross section and in each case shear blades 28 cut the material which has been expanded to the tensile-yield point and rejection slope 26 turns back the sheared strips.

As the final parts of tube 44 come upon shearing blades 48, the second reference member 20 may contact and drive head 32 toward plunger 24 collapsing the corrugated tube 34.

Tube 16 can take many forms depending upon the requirements of the system. For example, a series of spaced stage rings each having the same inner diameter but successively increasing in thickness can be co-axially arranged and axially spaced from one another and secured to a pair of connecting rods which converge toward plunger 24. The ends of connecting rods are secured to a plate or disk which is in turn secured to flange 18. The operation of this embodiment is the same as described above whereby the plunger penetrates each successive ring first expanding the same to the tensile-stress yield point after which the ring is sheared by blades 28 in the manner described. Another possibility is to form tube 16 with a sloping outer wall increasing in thickness with increasing distance away from the plunger.

Thus there has been described a new and improved mechanical shock absorber which requires no maintenance or service but which dampens large shock forces and dissipates great amounts of energy within a short distance of travel. In addition, the device according to the invention is a compact unit requiring little space and since it can be manufactured with standard parts, it is inexpensive to manufacture so that replacement costs are kept to a minimum.

What is claimed is:

1. An apparatus for reducing momentum during an impact time period comprising an elongated first member and a second member having means for expanding part of said first member to a predetermined degree when the two members are driven together by impact forces of destructive magnitude, said second member further including blade means for cutting the expanded part of said first member as the destructive impact forces continue to drive the members together; said first and second members being initially positioned such that they must be driven together through a given distance before said second member is expanded, said apparatus further comprising guide means coupled to one of said first and second members for maintaining alignment therefor, and resilient means for returning said members to their initial relative position whenever said members are moved therefrom by non-destructive forces which are less than a predetermined destructive force.

2. An apparatus as set forth in claim 1 wherein said second member increases in thickness in a direction away from the first member so that increasing amounts of energy are required to expand and cut the second member as the two members are driven together, said first member includes a base having a rejection slope surface facing the second member, said first mentioned means including a plunger mounted on the rejection slope surface and extending along an axis toward the second member, a plurality of shear blades coupled to the base, each having a cutting edge arranged to engage the second member parts after they are expanded and before they reach the rejection slope surface, said second member comprising an elongated tube member co-axially aligned with the plunger, said plunger penetrating without expanding one end of the tube member when the members are in the initial relative positions, said one end being initially spaced from the shear blades, the major portion of the tubes initially free from the plunger penetration having an inner dimension less than the plunger outer dimension.

3. An apparatus as set forth in claim 2 wherein said tube member includes a series of concentric stage tubes integrally connected together and increasing in thickness and decreasing in length in accordance with the axial distance of each stage tube measured from the base, said plunger having a collapsible guide at its penetrating end to maintain axial alignment for the members.

4. An apparatus as set forth in claim 3 wherein springs are coupled from the base to the tube member to provide resiliency therebetween, said springs breaking away when the base and tube members are driven together by destructive forces.

References Cited

UNITED STATES PATENTS

| | | |
|---|---|---|
| 3,236,333 | 2/1966 | Mitchell. |
| 3,339,674 | 9/1967 | Kroell et al. |

FOREIGN PATENTS

| | | |
|---|---|---|
| 472,071 | 3/1951 | Canada. |

DUANE A. REGER, *Primary Examiner.*